Aug. 16, 1966  NORIYUKI TAKAHASHI ET AL  3,266,506
AUTOMATIC CONTROLLING APPARATUS OF OPERATION FLUID PRESSURE
Filed July 9, 1963  2 Sheets-Sheet 1
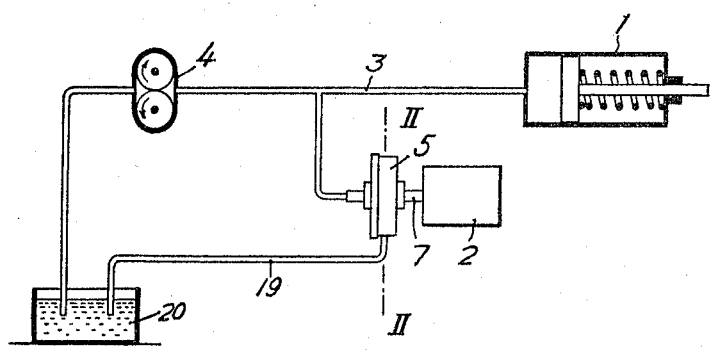
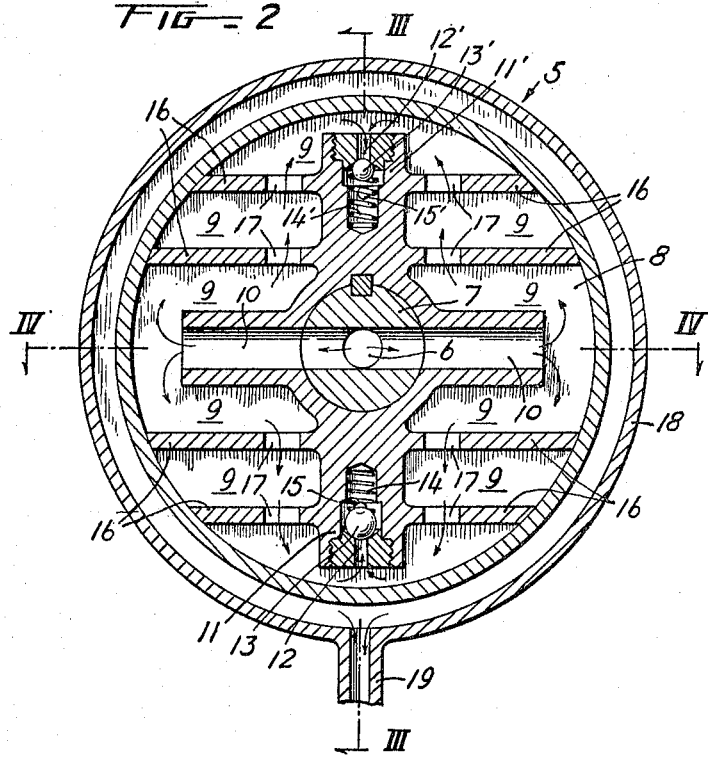
INVENTOR
Noriyuki Takahashi
Torao Hattori
BY
OSTROLENK, FABER, GERB & SOFFEN
ATTORNEYS

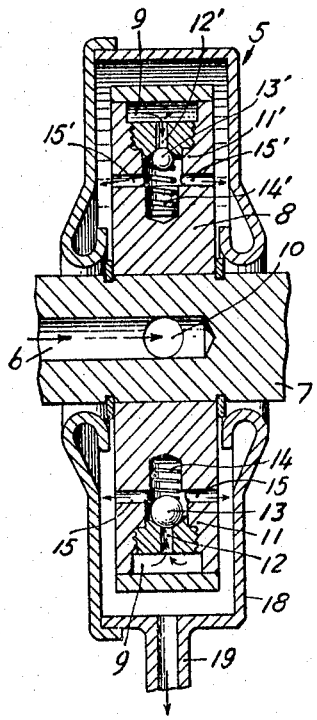
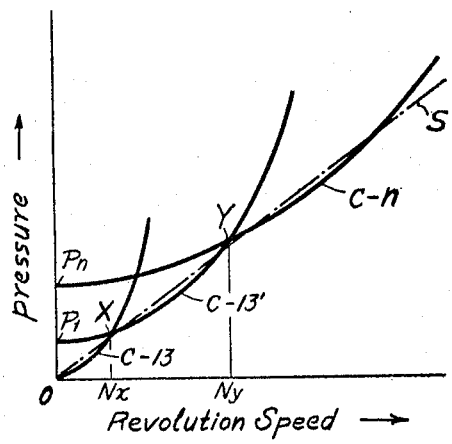
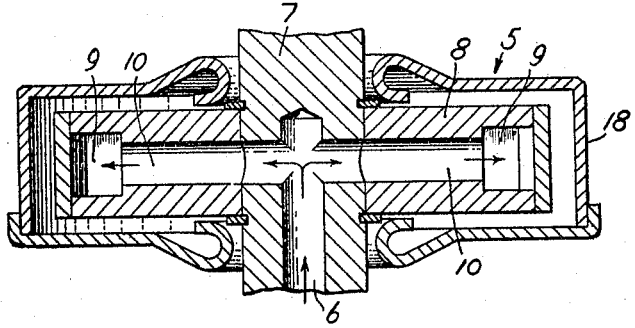

United States Patent Office 3,266,506
Patented August 16, 1966

3,266,506
AUTOMATIC CONTROLLING APPARATUS OF OPERATION FLUID PRESSURE
Noriyuki Takahashi, Nerima-ku, Tokyo, and Torao Hattori, Itabashi-ku, Tokyo, Japan, assignors to Kabushiki Kaisha Gijutsu Kenkyusho, Saitama-ken, Japan, a corporation of Japan
Filed July 9, 1963, Ser. No. 293,683
8 Claims. (Cl. 137—54)

The present invention relates to an automatic controlling apparatus of operation fluid pressure, and is more particularly directed to an apparatus of the type that the operation fluid pressure of a fluid operation mechanism which is to be controlled in accordance with the change of revolution speed of a driving motor may be properly controlled by a plurality of different control characteristic centrifugal valves rotating with the driving motor and springs of different resilient forces associating therewith.

The apparatus of the present invention is especially suitable for such a case that a fluid operation switching clutch or a fluid operation transmission or others in a motor car or the like is automatically controlled in accordance with the revolution speed of an engine, and in the case when the same is used to control a switching clutch, the clutch may be brought into make and break and half-clutch conditions properly in relation to the revolution of the engine.

The present invention apparatus is especially characterized in that a plurality of centrifugal valves rotatable by a driving motor are provided with respective springs of different outward pushing forces, and an outside fluid passage of each valve is in communication with an operation fluid whose pressure is to be controlled, and an inside fluid passage of each valve serves as a discharging passage, and the pressure control characteristic curves of these valves are designed to cross one with another.

In order that the invention may be clearly understood and readily carried into effect, the same will now be explained with reference to and by the aid of the accompanying drawings, wherein:

FIG. 1 is an explanation view of one form of apparatus according to the present invention, FIG. 2 is a sectional view taken along the line II—II in FIG. 1, FIG. 3 is a sectional view taken along the line III—III in FIG. 2, FIG. 4 is a sectional view taken along the line IV—IV in FIG. 2, and FIG. 5 is a control characteristic curve diagram of operation fluid pressure.

Referring to the drawings, numeral 1 denotes a fluid operation mechanism such as a fluid operation clutch or the like which is to be controlled in accordance with the revolution speed of a motor such as an engine 2, and the fluid pressure within a fluid supply pipe 3 connecting said mechanism 1 with a source of fluid pressure such as a gear pump 4 is controlled by a rotary pressure control mechanism 5, which is driven to rotate by said motor 2.

As clearly shown in FIGS. 2 to 4, the rotary pressure control mechanism 5 generally comprises a shaft 7 driven to rotate by said motor 2 and having a fluid passage 6 in communication with said fluid supply pipe 3, and a hollow disk portion 8 fixedly mounted on said shaft 7. Within the hollow disk portion 8, a fluid chamber 9 in communication always with the fluid passage 6 through a fluid passage 10, and two or more valve seats 11 and 11' are provided. These valve seats 11 and 11' have, respectively, at their outer ends fluid passages 12 and 12' of radial direction in communication always with the fluid chamber 9, centrifugal valves 13 and 13' closing said seats 11 and 11' from the inner sides thereof, springs 14 and 14' pushing said valves 13 and 13' outwardly, and discharging passages 15 and 15' for discharging the fluid flown in the inside of the valves 13 and 13' towards the outside of the disk portion 8. Numeral 16 denotes partitions dividing the interior of the fluid chamber 9 for separating centrifugally impurities in the fluid therefrom, numeral 17 denotes communication openings made in said partitions, and numeral 18 denotes a stationary fluid receiving casing covering said disk portion 8, which casing 18 has at its bottom a pipe 19 reaching a fluid tank 20 in FIG. 1.

It will be clear that the centrifugal valves 13 and 13' control the fluid pressure within the fluid chamber 9 and the fluid supply pipe 3 in accordance with the rise of the revolution speed of the shaft 7, namely, that of the driving motor 2. According to the present invention, however, the same is so characterized that the characteristics of the centrifugal valves 13 and 13' and the resilient forces of the springs 14 and 14' are differentiated. If, namely, it is so designed that, as shown in FIG. 2, the centrifugal valves 13 and 13' are arranged at equal distance from the center of the rotating shaft 7, the valve 13 is heavier than the valve 13', the spring 14 for the valve 13 is weak only enough to support the self-weight of the valve 13, the spring 14' for the valve 13' is of proper strong resilient force and the outside fluid passages 12 and 12' are equal in sectional area, then the pressure within the fluid supply pipe 3 is first controlled by the valve 13 in accordance with the rise of revolution speed of the shaft 7. If, namely, the resilient force of the spring 14 is neglected because of its weakness, the pressure within the pipe 3 may be controlled along a sharp rising curve C–13 in FIG. 5 in accordance with the increase in centrifugal force of the heavier valve 13.

As, on the other hand, the valve 13' is acted by the strong spring 14' and at the same time the self-weight thereof is comparatively small, the pressure within the pipe 3 which is to be controlled by said valve 13' starts at a control pressure $P_1$ corresponding to the resilient force of the spring 14' and is controlled along a curve C–13' gentler in rising degree than the curve C–13. Below a revolution speed $Nx$ corresponding to a crossing X of the two curves C–13 and C–13', however, the control pressure of the valve 13 is lower than that of the valve 13', so that the fluid escapes through the valve 13 and the valve 13' never be opened. If the revolution speed is raised above $Nx$, conversely, the control pressure of the curve C-13' becomes lower than that of the curve C–13, so that the pressure within the pipe 3 is controlled along the curve C–13' and the valve 13 is inoperative. Thus the pressure within the pipe 3 may be controlled along the curves C–13 and C–13' at both sides of the point X, so that the average value can be one that is near a straight line S or any others.

If, additionally, though not illustrated in drawings, a third centrifugal valve mechanism which is lighter in weight than the valve 13' and is acted by a stronger spring than the spring 14' is provided, the characteristic thereof is designed to run along a curve C–$n$ starting at a point P$n$ in FIG. 4 and the crossing thereof with the curve C–13' is represented by Y, then the pressure within the pipe 3 can be controlled along the straight line S in connection with the rise of revolution speed more than N$y$ corresponding to the point Y.

In the present invention apparatus, as described above, the pressure of the operation fluid may be controlled in due order in accordance with respective control characteristics peculiar to respective centrifugal valves, so that the whole control characteristic can be made to be a proper one which rises in accordance with the revolution of the motor.

In order to differentiate the characteristics of the centrifugal valves, that is, the shapes of the curves C-13, C-13' and others in FIG. 5, it is designed for convenience in the above description that only the weight of the valves 13, 13' and others are different but the other conditions are equal. However, almost the same object can be accomplished by the way that the valves are equal in weight but are different in their distances from the revolution shaft or that the fluid passages 12, 12' and others are different in sectional area.

What we claim is:

1. An automatic pressure controlling apparatus comprising a rotative member coupled to a rotationally operated mechanism for rotation therewith, operating fluid passage means extending through said member for receiving a fluid where pressure is to be controlled in accordance with the rotational input to said rotative member, and a plurality of centrifugally operated valves carried by said rotative member, each of said valves having an outside fluid passage in communication with the operating fluid in said operating fluid passage means, and an inside fluid passage in communication with a pressure discharge passage means for said operating fluid, individual spring means for urging said valves to a closed condition in conjunction with the centrifugally developed forces of said rotative member, said valves when in said closed condition sealing said operating fluid passage means from said discharge passage means, and when opened progressively establishing a communication passage between said operating fluid passage means and said discharge passage means, the pressure control characteristics of said valves operatively related, such that individual ones of said valves sequentially control the pressure of the operating fluid between predetermined revolutionary speeds.

2. An automatic controlling apparatus according to claim 1, said individual spring means of different outward pushing forces.

3. In an automatic controlling apparatus according to claim 1, successive ones of said valve means opening at successively higher rotational speeds, and having successively less acute pressure-versus-speed control characteristics, such that their control characteristics cross with another, for sequentially transferring pressure control to successive ones of said valve means at such crossing points.

4. In an automatic controlling apparatus according to claim 3, the successive portions of said control characteristics additively defining a substantially linear operating fluid pressure control characteristic.

5. An automatic controlling apparatus of operation fluid pressure according to claim 1, wherein the valves are different in weight but are equal in their distances from the center of the revolution shaft.

6. An automatic controlling apparatus of operation fluid pressure according to claim 1, wherein the valves are equal in weight but are different in their distances from the center of revolution.

7. An automatic controlling apparatus according to claim 1, wherein the outside fluid passages are different one with another.

8. In combination with a fluid operated mechanism, a rotationally operated mechanism and a pressurized source of operating fluid; an automatic pressure controlling apparatus in the flow path of said operating fluid for correlating the pressure of the operating fluid to the rotational speed of said rotationally operated mechanism, said pressure controlling apparatus comprising a rotative member coupled to said rotationally operated mechanism for rotation therewith, operating fluid passage means extending through said member, a plurality of centrifugally operated valves carried by said rotative member, each of said valves having an outside fluid passage in communication with the operating fluid in said operating fluid passage means, and an inside fluid passage in communication with a pressure discharge passage means for said operating fluid, individual spring means for urging said valves to a closed condition, in conjunction with the centrifugally developed forces of said rotative member, said valves when in said closed condition sealing said operating fluid passage means from said discharge passage means, and when opened progressively establishing a communication passage between said operating fluid passage means and said discharge passage means, the pressure control characteristics of said valves operatively related, such that individual ones of said valves sequentially control the pressure of the operating fluid between predetermined revolutionary speeds.

References Cited by the Examiner

UNITED STATES PATENTS

| | | | |
|---|---|---|---|
| 1,285,998 | 11/1918 | Hick | 137—56 |
| 1,347,208 | 7/1920 | Cochburn | 137—56 |
| 2,377,350 | 6/1945 | Marsh | 137—56 X |
| 2,711,749 | 6/1955 | Hettinger | 137—56 |
| 2,741,256 | 4/1956 | Barton | 137—56 |

WILLIAM F. O'DEA, *Primary Examiner.*

CLARENCE R. GORDON, *Examiner.*